E. N. BREITUNG.
AUTOMOBILE TIRE.
APPLICATION FILED JAN. 27, 1913.
1,081,010.
Patented Dec. 9, 1913.
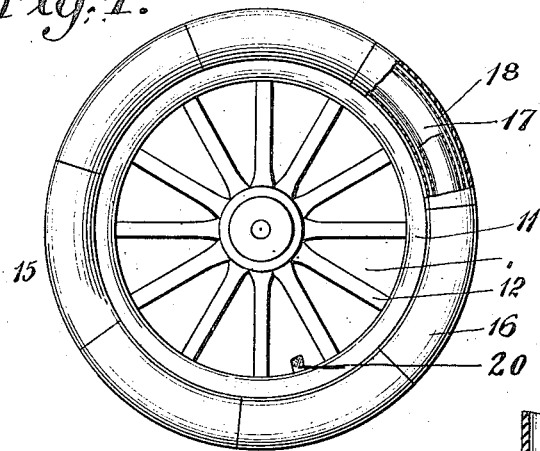
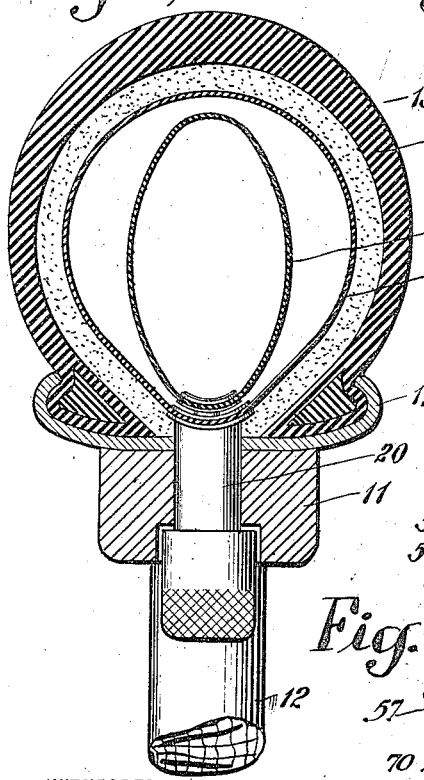
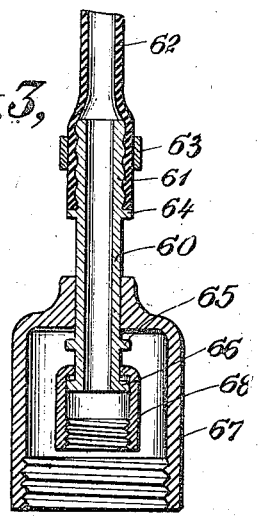
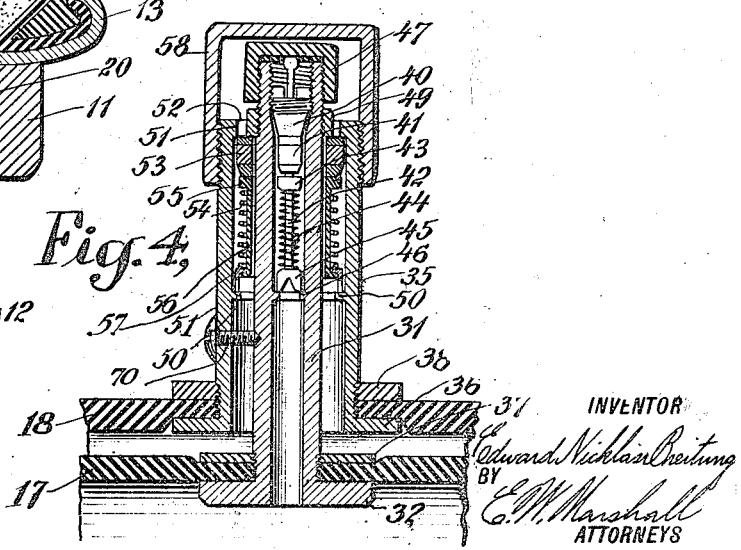

UNITED STATES PATENT OFFICE.

EDWARD NICKLAS BREITUNG, OF MARQUETTE, MICHIGAN.

AUTOMOBILE-TIRE.

1,081,010.

Specification of Letters Patent.  Patented Dec. 9, 1913.

Application filed January 27, 1913. Serial No. 744,329.

*To all whom it may concern:*

Be it known that I, EDWARD NICKLAS BREITUNG, a citizen of the United States, and a resident of Marquette city, in the county of Marquette and State of Michigan, have invented certain new and useful Improvements in Automobile-Tires, of which the following is a specification, reference being had to the accompanying drawings, forming a part thereof.

My invention relates to tires for vehicle wheels and has for its object to provide a simple and durable tire of the pneumatic or inflated type which shall be specially adapted for use with the wheels of automobiles and which shall comprise two or more tire tubes arranged to be inflated one at a time.

Other objects of my invention will hereinafter be set forth.

I will describe my invention in the following specification and point out the novel features thereof in appended claims.

Referring to the drawings,—Figure 1 is an elevation of a wheel equipped with a tire which embodies my invention, a section of the tire being broken away to show the shoe and the tire tubes in section. Fig. 2 is a transverse sectional elevation on a larger scale, of a portion of the wheel rim and tire shown in Fig. 1. Fig. 3 is a longitudinal section on a still larger scale, of a pump or air bottle connector and Fig. 4 is a longitudinal section of a tire valve adapted for use with a plurality of tire tubes such as are shown in Figs. 1 and 2 and arranged for attachment to the connector of Fig. 3.

While my tire tube arrangement is of special advantage when used with a sectional shoe and is illustrated in this connection, my invention is not limited in this regard and may be used with an ordinary continuous shoe.

10 is a vehicle wheel such for example as is used on an automobile and has a felly 11 and spokes 12. A rim 13 is secured to the felly as usual.

15 is a tire and comprises a shoe 16 which may be either continuous or made in sections as shown in Fig. 1, and two or more elastic tire tubes 17 and 18 one within the other and a plural valve mechanism 20.

The valve mechanism may be constructed in any suitable manner within the spirit and scope of my invention.

One form is shown in Fig. 4 and comprises a relatively small tube 31, having a flange or head 32 and being internally and externally screw threaded near its end, and a larger tube 35 having a flange or head 36. The tube 31 of the valve mechanism extends through a hole in the tire tube 17 and is secured to the tire tube by a nut 37 which squeezes the rubber of the tube against the under side of the head 32 as shown in Fig. 6 and forms an air tight joint.

The tube 35 is large enough to fit loosely over the tube 31 and extends through a hole in the tire tube 18 to which it is joined by a nut 38.

A hollow plug 40 is screwed into the end of the tube 31 and is arranged to form a seat for a valve 41. This valve is mounted on a rod 42 having a collar 43 against which acts a spring 44. A notched thimble 45 is slidably mounted on the rod 42 near its lower end which is enlarged to hold the thimble in position. The spring 44 surrounds the rod 42 and is interposed between the thimble and the collar 43, the notched end of the thimble being in engagement with an annular shoulder 46 on the inside of the tube 31 so that the valve 41 is pressed against its seat by the spring. The upper end of the rod extends through and beyond the hollow plug 40 to the end of the tube 31 which is provided with a screw cap 47.

The outer tube has an inwardly extending annular projection 50 and an inwardly extending end flange 51. A collar 49 is screwed onto the smaller tube 31 and fits loosely within the flange 51, an annular port 52 being thereby provided for the outer tire tube 18.

An annular valve 53 is adapted to close the port and is pressed onto its seat by a spring 54 which is interposed between a flange 55 of a sleeve 56 and a notched thimble 57 at the lower end thereof. The thimble is arranged to slide on the sleeve and presses against the annular projection 50.

A cap 58 is screwed onto the end of the tube 35 and covers the entire valve mechanism.

The relative longitudinal positions of the tubes 31 and 35 may be fixed by any suitable means such as a plurality of set screws 70, only one of which is shown.

The tire tubes are applied to a wheel as a single tube is applied, the shoe or shoe sections being secured to the rim in the usual manner.

When the shoe is in place the outer cap 58 is removed and is replaced by the connector of an air pump or air bottle. The pressure of the air applied pushes down the valve 53 in opposition to the spring 54 and inflates the outer tire tube 18. The inner tube 17 remains collapsed and occupies a small space within the outer tube 18 and out of contact with its walls. In fact the pressure in the outer tube 18 tends to completely flatten the tube 17 although for convenience in illustrating the arrangement it is shown partially expanded in the drawings.

If the tube 18 should become punctured in operation it is only necessary to repair the shoe as far as the nature of the accident may require and to inflate the tube 17. The tire is now in as good running condition as at first, and in fact the tube 17 is more protected than the tube 18 since the one is covered by the other. Obviously the time required to repair a puncture is very small under these conditions. The inner tube 17 is inflated by removing both of the caps 58 and 47 and screwing a suitable pump or air bottle connector onto the tube 31. In order that a single pump discharge pipe or tube may be used for inflating either of the tire tubes the connector shown in Fig. 3 may be used. This comprises a tubular member 60 having a corrugated end section 61 to which a flexible tube 62 is attached by a clamping ring 63, and annular projections or collars 64, 65 and 66. On the tubular member is mounted a coupling 67 which is adapted to be screwed onto the end of the outer valve tube 35 and a coupling 68 which is adapted to be screwed onto the inner valve tube 31. The couplings 67 and 68 are arranged to slide on the tubular member between the collars 64 and 65, and the collars 65 and 66 respectively. If a sectional shoe is used, even a bad break in the tire can be very quickly repaired by replacing the broken section only and inflating the remaining tire tube. It is therefore evident that both the sectional tire shoe and my novel arrangement of tire tubes become especially advantageous when used in combination.

What I claim is:

1. A vehicle tire comprising a shoe, tire tubes located one within the other, and a valve mechanism comprising substantially concentric tubular members respectively secured to the tire tubes and forming independent inlet passages therefor, a hollow valve seat within the inner tubular member, a spring-pressed valve adapted to close the opening in the inner tubular member, coöperating annular projections on the outside of the inner tubular member and the inside of the outer tubular member constituting an annular valve seat; and a spring-pressed annular valve adapted to close the opening in the outer member.

2. A vehicle tire comprising a shoe, tire tubes located one within the other, and a valve mechanism having a single inlet and comprising a pair of substantially concentric tubular members secured to the respective tire tubes and forming independent inlet passages therefor, a bushing within the inner tubular member constituting a valve seat, a spring-pressed plug valve adapted to close the opening in the inner tubular member, a collar on the outside of the inner tubular member, and an annular projection on the inside of the outer tubular member coöperating with the collar to constitute an annular valve seat; and a spring-pressed annular valve adapted to close the opening in the outer tubular member whereby the tire tubes may be independently inflated.

In witness whereof, I have hereunto set my hand this 25th day of January in the year 1913.

EDWARD NICKLAS BREITUNG.

Witnesses:
W. P. HAMILTON,
MAX BREITUNG.

---

Copies of this patent may be obtained for five cents each, by addressing the "Commissioner of Patents, Washington, D. C."